H. DECHAMPS.
PIPE JOINT.
APPLICATION FILED FEB. 20, 1914.

1,191,575.

Patented July 18, 1916.

Witnesses:
Marcus L Byng
J. Ellis Glen

Inventor:
Heinrich Dechamps,
by: Albert G. Davis
His Attorney.

UNITED STATES PATENT OFFICE.

HEINRICH DECHAMPS, OF CHARLOTTENBURG, GERMANY, ASSIGNOR TO GENERAL ELECTRIC COMPANY, A CORPORATION OF NEW YORK.

PIPE-JOINT.

1,191,575. Specification of Letters Patent. Patented July 18, 1916.

Application filed February 20, 1914. Serial No. 819,937.

*To all whom it may concern:*

Be it known that I, HEINRICH DECHAMPS, a subject of the King of Prussia, residing at Charlottenburg, Germany, have invented certain new and useful Improvements in Pipe-Joints, of which the following is a specification.

The present invention relates to pipe joints, and particularly to joints which are well adapted for use in connection with internal combustion engines such as are provided with means for circulating a cooling medium through a chamber in the piston head for cooling purposes, and in which jointed pipes are used for conveying the medium to and from the chamber. In arrangements of this character it is not only important that the members of the joints of the pipe oscillate freely upon each other, but also that they be tight so as to prevent leakage through the same into the crank casing. Particularly is this true when the cooling medium is water as its presence in the lubricating oil in the crank casing causes a frothy mixture and interferes with the action of the lubricating pump. These joints are moreover subjected to very rapid oscillations in response to the movements of the piston and hence it is desirable to have a joint which can be kept well lubricated. Even with the most efficient lubrication, however, the joints wear to a greater or less extent, and owing to the relatively high pressure used for pumping the cooling fluid, a slight amount of wear will permit considerable leakage around the joints. It is accordingly essential that the joints be so designed that they can be readily adjusted to take up any wear and thus prevent leakage.

One object of my invention is to provide an improved joint for use, for example in a cooling system of this character which will oscillate freely, can be kept well lubricated so as to reduce the wear to a minimum, and which can be easily and quickly adjusted to take up any wear which may occur and which would otherwise permit of leakage.

A further object of my invention is to provide for use in such a system a joint which is small and compact and which is easy to construct and assemble.

Other objects of my invention, as well as the novel structural features thereof will appear in the course of the following specification wherein I have described a structure embodying the same.

Figure 1:
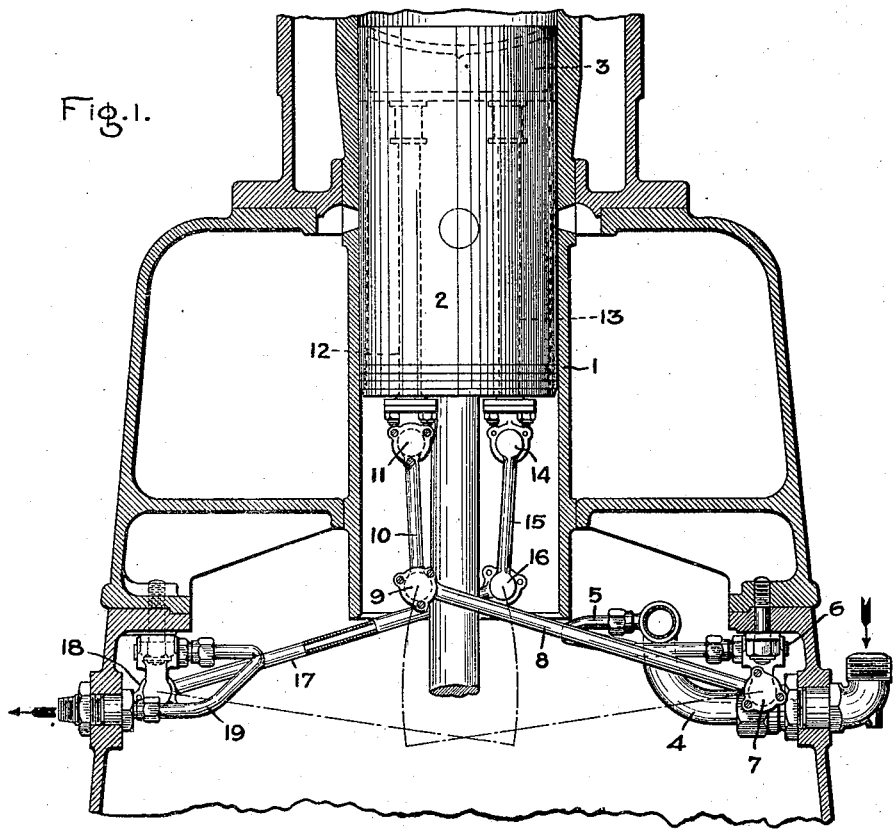
Figures 2, 3:
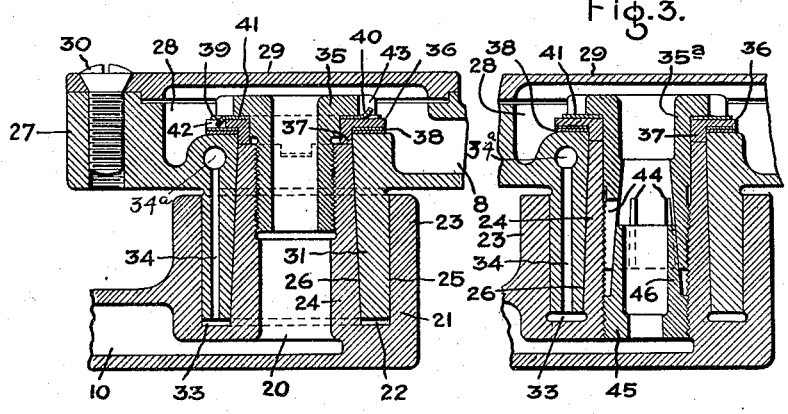

Referring to the drawing, Figure 1 shows in vertical section an internal combustion engine provided with a piston cooling arrangement embodying my improvements; Fig. 2 is a longitudinal section through one of the joints, and Fig. 3 shows a modified form which my joint may take.

Reciprocating in the cylinder 1 of the engine is a piston 2 having a cooling chamber 3 arranged in the head thereof. The cooling medium, as oil or water, is taken from the conduit 4, which may be common to the several cylinders of a multicylinder engine, by the pipe 5. The other end of the pipe 5 is rigidly fastened to the base of the engine as shown at 6, and through joint 7 communicates with pipe 8 from which the cooling fluid is conducted to chamber 3 through joint 9, pipe 10, joint 11 and pipe 12. The cooling fluid is conducted from the chamber 3 by way of pipe 13, joint 14, pipe 15, joint 16, pipe 17, joint 18 and pipe 19. The fluid may be caused to circulate for example by means of a suitable pump and the rapidity of the circulation will be determined by the amount of heat to be carried off. The attendant will increase or decrease the rate of flow of the fluid to suit the operating conditions. It will be observed that the ends of pipes 8 and 17 overlap and are on opposite sides of the connecting rod of the piston. This arrangement permits the use of pipes of maximum length for a given engine and hence the angular movements of the joints and the wear thereon are correspondingly reduced. Each of the joints referred to is of like construction and a description of one, as joint 9, will, therefore, be sufficient.

Referring to Fig. 2, the pipe section 10 is formed with an enlarged head having a central opening 20, formed in the projection 21. This projection has a relatively deep annular groove or recess 22 formed therein dividing it into two walls 23 and 24. One wall, as 23, has a perpendicular surface 25 forming what may be termed a guiding surface, while the other wall, as 24, has an angular surface 26 forming a tapering cone shaped seat. The wall 24 is shown as projecting beyond wall 23 and its inner surface or bore is threaded for a portion of its length. The pipe section 8 is formed with an enlarged head 27 having a chamber 28 closed by cover 29. This cover may be held in place in any suitable manner, as by screws 30. Formed integral with the head is a projection 31 having one straight and one angular or cone shaped surface for coöperation with the corresponding surfaces of projection 21. This projection 31 telescopes into the groove 22 as will be readily seen from Fig. 2. The projection 31 terminates at a point short of the bottom of groove 22 forming an annular space 33 with which communicates the passage 34 for the introduction of lubricant. Lubricant is introduced into the passage 34 through an opening 34ª in the head 27. This space also permits of the adjustment of the joint to keep the same tight as will be more fully explained hereinafter. By this simple arrangement and without any additional parts I provide for the efficient lubrication of the joint and I regard this arrangement as one of the important features in my structure.

The members of the joint are drawn together and held in place by the hollow bolt 35 which is threaded into the annular wall 24 from the outer end. In the present embodiment the base of projection 31 is shown as being thickened and projecting inwardly toward the cover 29 thereby providing a strong reinforced structure.

As already pointed out it is desirable to provide for adjusting the parts relative to each other so as to provide for taking up wear. To this end I arrange between the base of projection 31 and the head of the hollow bolt 35 a relatively thick washer 36 having an inturned flange 37. This washer is of such a size that the flange 37 extending inside of projection 31 rests against the end of wall 24. Between washer 36 and the base of projection 31 I place thin washers or shims 38. By varying the number or thickness of the shims 38 I can readily adjust the parts of the joint with relation to each other as will be readily apparent. For example, should it be desired to tighten the joint to take up any wear of the parts, all that is necessary is to remove the bolt 35 and washer 36, insert an additional shim 38 or substitute a slightly thicker one, replace the washer 36 and screw the bolt 35 into place. This will draw the parts of the joint together. As will be clear, washers 38 must be provided to such a thickness that when the bolt 35 is screwed firmly into place, the joint is just sufficiently tight to prevent leakage. If the joint were unduly tight it would, of course, cause unnecessary friction and wear of the parts.

The bolt 35 having been firmly screwed to its seat may be locked into place by any suitable means. In Fig. 2 I have shown the same as locked by means of the tongues 39 and 40 struck from the washer 41, the tongue 39 being turned into the slot or opening 42 formed in washer 36, while the tongue 40 is turned up into slot or opening 43 formed in the head of bolt 35. As many of these tongues and slots may be provided as found desirable.

Referring to Fig. 3, I have shown a modified means and one which I now prefer for locking the hollow bolt in place. Otherwise the arrangement is the same. In this figure the threaded bolt 35ª has its end slotted as shown at 44 and its inner surface made conical to coöperate with the outer conical surface of a projection 46 formed on locking nut 45 made in the form of a plug. In assembling the joint as shown in Fig. 3, the locking nut 45 is first screwed downward beyond the position it occupies when finally adjusted. The bolt 35ª is then adjusted to position to provide for the proper tightness of the joint as already explained in connection with Fig. 2. The locking nut 45 is then turned back to bring the conical surfaces of the projection and bolt into firm engagement, thereby locking the bolt in place. The locking nut 45 is hollow, the opening therethrough being suitably shaped to receive the end of a wrench for adjusting purposes.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A pivotal joint for connecting adjacent pipe ends comprising hollow heads formed on adjacent pipe ends, telescoping projections having coöperating conical surfaces carried by adjacent heads, a hollow threaded bolt for securing the heads together, which bolt is threaded into the inner of said projections with its head overlapping both projections, a washer between the head of the bolt and one of the projections having a flange seating against the end of the other projection, and other washers coöperating with the first named washer for adjusting the relation of the heads.

2. A pivotal joint for connecting adjacent pipe ends comprising hollow heads formed on adjacent pipe ends and each having an opening therein, a projection surrounding one of said openings, a projection surrounding the other of said openings and adapted to telescope with the first named projection, a hollow threaded bolt having a cone shaped inner surface and provided with slots in its end for clamping said projections together, and a locking nut having a cone shaped surface coöperating with the similar surface of the bolt to lock the same in position.

3. A pivotal joint for connecting adjacent pipe ends, comprising hollow ends formed on adjacent pipe ends, telescoping projections having coöperating conical surfaces carried by adjacent heads, a hollow threaded bolt having a cone-shaped inner surface and provided with slots in its end for securing the heads together, said bolt being threaded into the inner of said projections with its head overlapping both projections, a washer between the head of the bolt and one of the projections having a flange seating against the end of the other projection, other washers coöperating with the first named washer for adjusting the relation of the heads, and a locking nut having a cone-shaped surface coöperating with a similar surface of the bolt to lock the same in position.

4. A pivotal joint for connecting adjacent pipe ends, comprising hollow heads formed on adjacent pipe ends, and each having an opening therein, a projection surrounding one of said openings and having a groove therein, one side of the groove being straight to form a cylindrical guiding surface, and the other being angular to form a cone-shaped tapered seat, a projection surrounding the other of said openings and formed with a straight and an angular side and adapted to telescope into said groove, the side of the last named projection coöperating with the sides of the groove to form a tight joint and terminating short of the bottom of the groove to provide a lubricant chamber, a hollow threaded bolt for securing the heads together, which bolt is threaded into the inner of said projections with its head overlapping both projections, a washer between the head of the bolt and one of the projections having a flange seating against the end of the other projection, other washers coöperating with the first named washer for adjusting the relation of the heads, and means for locking the nut against turning movement.

In witness whereof, I have hereunto set my hand this 24 day of January, 1914.

HEINRICH DECHAMPS.

Witnesses:
 BANHAD KRIMK,
 ALFRED KÜPPER.

Copies of this patent may be obtained for five cents each, by addressing the "Commissioner of Patents, Washington, D. C."